(No Model.) 3 Sheets—Sheet 1.

J. W. RUGER.
CRACKER MACHINE.

No. 467,710. Patented Jan. 26, 1892.

Witnesses:
Emil Neuhart
Fred. C. Guyer

James W. Ruger, Inventor.
By Wilhelm Bonner
Attorneys.

(No Model.) 3 Sheets—Sheet 2.

J. W. RUGER.
CRACKER MACHINE.

No. 467,710. Patented Jan. 26, 1892.

Witnesses:
Emil Neuhart
Fred. C. Geyer

J. W. Ruger, Inventor.
By Wilhelm Bonner
Attorneys.

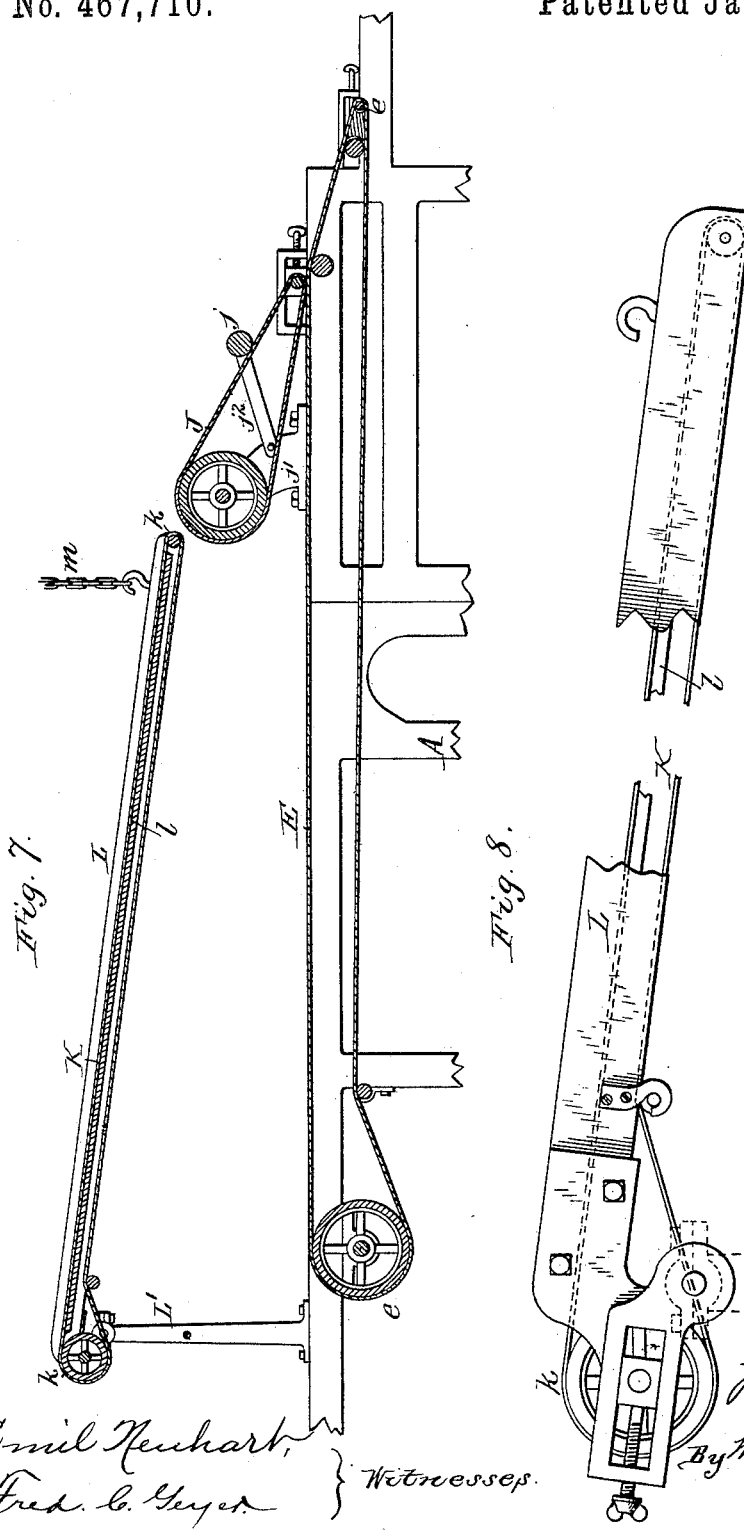

UNITED STATES PATENT OFFICE.

JAMES W. RUGER, OF BUFFALO, NEW YORK.

CRACKER-MACHINE.

SPECIFICATION forming part of Letters Patent No. 467,710, dated January 26, 1892.

Application filed October 14, 1891. Serial No. 408,644. (No model.)

*To all whom it may concern:*

Be it known that I, JAMES W. RUGER, a citizen of the United States, residing at the city of Buffalo, in the county of Erie and State of New York, have invented new and useful Improvements in Cracker-Machines, of which the following is a specification.

This invention relates to that class of cracker-machines in which the sheet of dough is conveyed from the dough-press or feed-rollers beneath a reciprocating cutter by an endless apron, the crackers or cakes being deposited into pans while the scrap-dough passes onward in a different direction.

Prior to my invention the scrap-dough was conducted from the feed-apron to an elevating-apron, whereby it was deposited upon a table from which it was removed from time to time by an attendant and returned to the feed-hopper.

One of the objects of my invention is to automatically return the scrap-dough to the feed-hopper, so as to save the time and labor of such attendant.

The invention has the further objects to facilitate the manipulation of the feed-rollers of the dough-press in cleaning them, and to so construct the machine that the same can be readily adapted for making snaps and similar goods as well as soft or hard dough goods.

Figure 1:
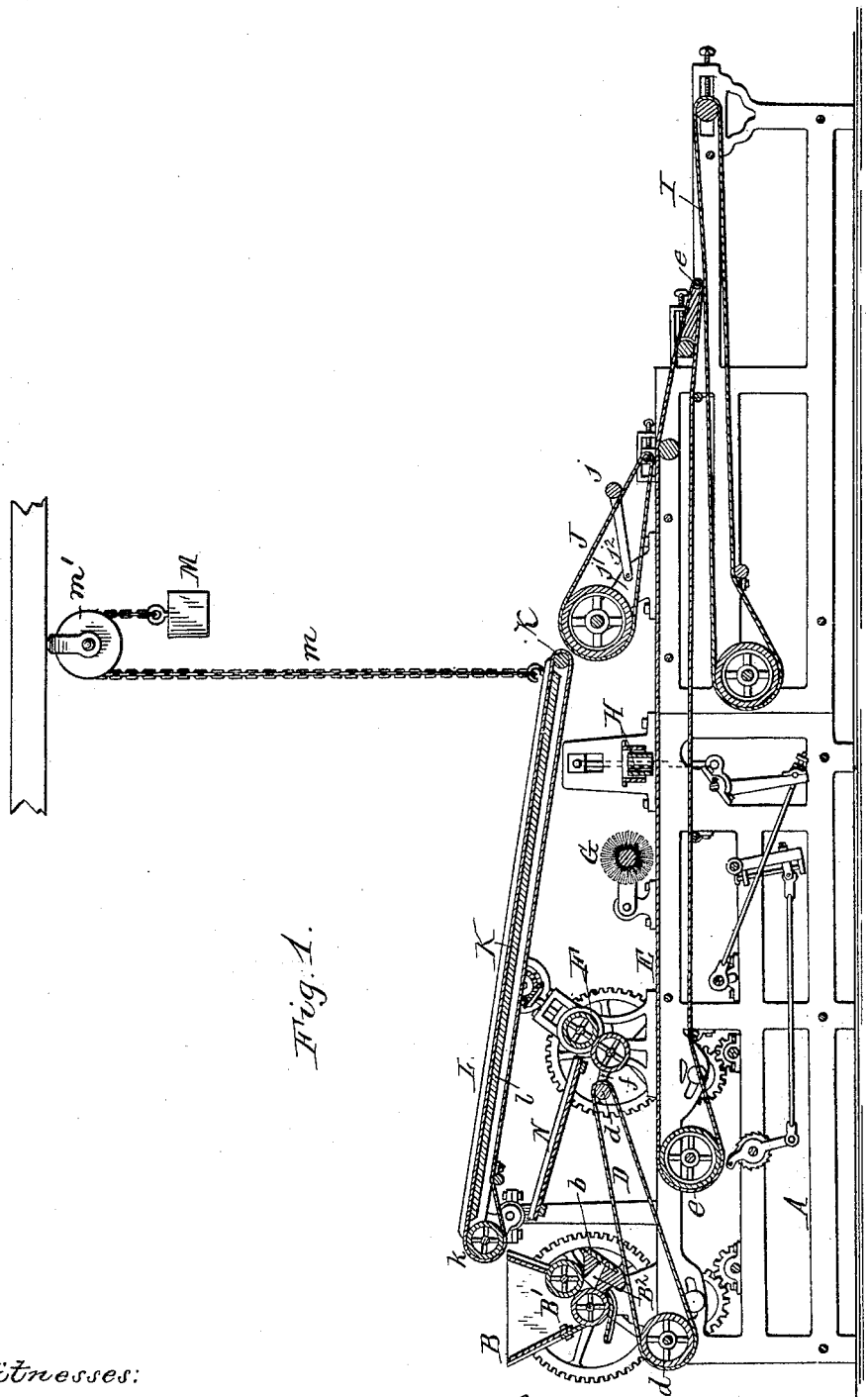
Figure 2:
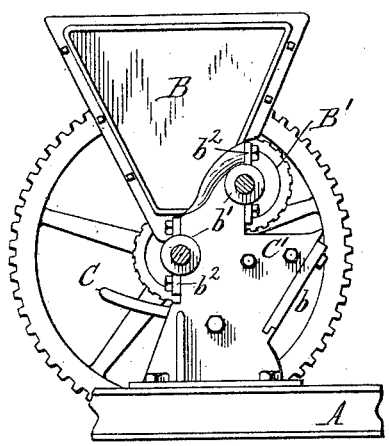
Figure 3:
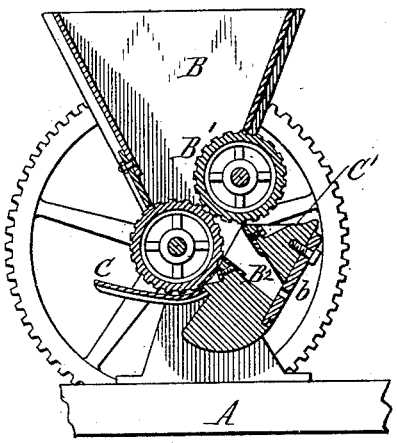
Figure 4:
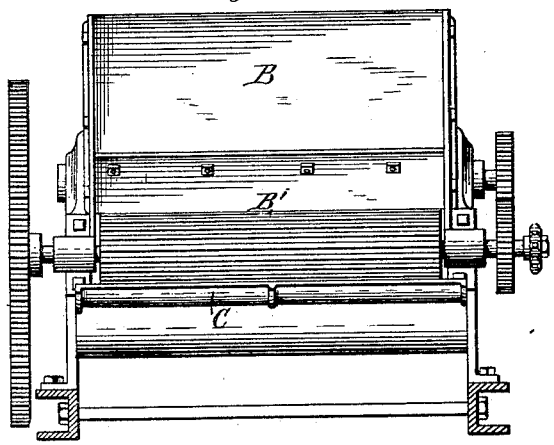
Figure 5:
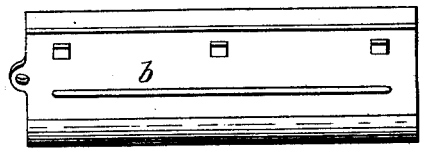
Figure 6:
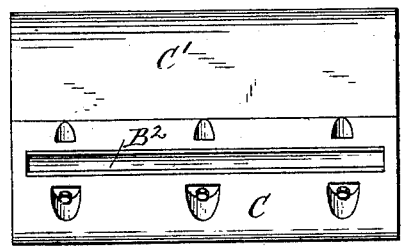

In the accompanying drawings, consisting of three sheets, Figure 1 is a longitudinal sectional elevation of my improved cracker-machine. Fig. 2 is an enlarged side elevation of the dough-press. Fig. 3 is a vertical cross-section thereof. Fig. 4 is a front view of the dough-press. Fig. 5 is a rear view of the lower portion thereof. Fig. 6 is a top plan view of the roller supports or tables arranged underneath the feed-rollers of the dough-press. Fig. 7 is a longitudinal section of the return scrap-carrier and co-operative parts on an enlarged scale. Fig. 8 is a fragmentary side elevation of the front apron of said carrier.

Like letters of reference refer to like parts in the several figures.

A A represent the side frames of the machine, which are connected by cross-stays.

B is the dough-press consisting of a hopper or trough into which the dough is placed, a pair of feed-rollers B', arranged in the lower portion of the hopper, and a restricted throat or receptacle $B^2$, arranged below the feed-rollers, and to the lower end of which is applied the die $b$, through which the dough is forced in a continuous sheet by the feed-rollers. As more clearly shown in Figs. 2, 3, and 4, the feed-rollers are journaled in bearings $b'$, arranged on the side frames of the press and having removable caps $b^2$, which permit the rollers to be taken out of the bearings for cleaning them when necessary or preparatory to changing the dough.

C C' are tables or roller-supports arranged, respectively, on the front and rear sides of the press, underneath the feed-rollers, and projecting outwardly therefrom. These tables form supports for the rollers in cleaning the same and permit them to be rolled outward to a convenient and accessible position after removing the caps of their bearings, without the necessity of carrying the rollers or lifting them, which is a laborious operation. After cleaning the rollers they are again rolled into their proper position and the caps of their bearings replaced. The tables C C' also serve to catch any scraps escaping from the press before reaching the die and prevent the same from falling upon the sheet of dough below and rendering it uneven or lumpy. The rear table C' is preferably formed integrally with the plate to which the die $b$ is secured, and the front table C is secured between the side frames of the press.

D represents a preliminary carrier or endless feed-apron arranged underneath the dough-press and upon which the sheet of dough is deposited as it comes from the press. This apron runs around guide-rollers $d\ d$.

E is the main carrier or apron having its receiving end arranged underneath the delivery end of the feed-apron D and running around guide-rollers $e\ e$, journaled near opposite ends of the machine.

F represents a pair of gaging or compressing rollers arranged over the head of the main apron E, behind the delivery end of the preliminary feed-apron. These compressing-rollers receive the sheet of dough from the preliminary apron and reduce it to the desired thickness, one of the rollers being preferably mounted in adjustable bearings, so that the thickness of the sheet of dough may be varied at pleasure. The delivery end of the preliminary apron is separated from the compressing-rollers by a small space, as shown at *f*, in Fig. 1, through which the sheet of dough may be allowed to pass directly upon the main apron without passing through the compressing-rollers.

G is the brush whereby the flour sprinkled upon the advancing sheet of dough is dusted backwardly in a well-known manner, and H is the reciprocating cutter, which may be of any ordinary construction.

I is the carrier or apron arranged below the delivery end of the main apron E and upon which the pans are placed which receive the cakes or crackers.

The return-carrier, whereby the perforated sheet of scrap-dough is returned to the feed-hopper, is, for convenience, composed of two endless aprons, an elevating or rear apron J, which receives the scrap-dough from the main apron, and a return or front apron K, which takes the scrap-dough from the front end of the elevating apron and conveys it to the feed-hopper and which forms practically a continuation of the elevating-apron.

*j* is a holder or transverse bar extending across the upper side of the elevating-apron J, near its receiving end, and which presses the end of the sheet of scrap against the apron to prevent slipping thereof. This holder is pivoted to a standard *j'* by arms *j²*, and holds the sheet of dough against the apron by gravity.

The return-apron K extends from the delivery end of the elevating-apron to the hopper of the dough-press B and runs around guide-rollers *k*, journaled in a frame L. The latter consists of longitudinal side pieces or flanges and a connecting-plate *l*, which supports the upper portion of the apron between the guide-rollers K. The supporting-frame L is preferably pivoted at its delivery end to standards L', secured to the main frame A, so that the receiving end of the apron can be adjusted vertically or raised out of the way for changing the reciprocating cutters. The free end of the return-apron is counterbalanced by a weight M, which is connected with the apron by a chain *m*, running around a pulley *m'*, suspended from the ceiling or other support. This counter-balance holds the apron at any desired elevation.

The preliminary feed-apron D has a continuous movement, while the receiving-aprons are operated intermittently in a well-known manner by any approved mechanism.

When the advancing sheet of scrap-dough on the main apron reaches the lower end of the elevating-apron J, the operator doubles or folds the end thereof over the adjacent end of the elevating-apron and holds it against the apron until it passes under the holder *j*, after which the sheet of scrap is carried onward by the elevating-apron and delivered to the return-apron K, which latter conveys it into the feed-hopper of the dough-press, where it is mixed with the fresh dough supplied to the hopper. The dough-press being constantly supplied with scrap-dough by the return-apron and with fresh dough by the attendant, the new and scrap doughs are mixed together in about equal quantities, and a uniform sheet composed of such mixture is continuously discharged from the dough-press upon the preliminary feed-apron below. By returning the scrap-dough to the feed-press or feed-rollers by automatic means, instead of employing manual labor for the purpose, the cost of such labor is saved and the scrap-dough is delivered into the dough-press in uniform quantities and in a more reliable manner than by an attendant, thereby producing better and more uniform goods.

When the machine is used for making goods of soft dough, the sheet of dough is allowed to pass over the delivery end of the preliminary feed-apron D directly upon the main apron E without being passed through the compressing-rollers F. The sheet is then carried by the main apron under the cutters and the cakes are deposited into the pans upon the apron I and the scrap is returned to the dough-press, as before described. When it is desired to make snaps or similar goods which require a close-grained dough, the sheet of dough as it comes from the preliminary apron is directed by hand between the compressing-rollers F and then allowed to pass upon the main feed-apron below, whence it passes under the cutters. In making goods of hard dough the dough after passing through the required number of brakes is fed directly to the compressing-rollers by an inclined feed-board N without passing through the dough-press and over the preliminary feed-apron, the sheet of dough descending upon the main feed-apron from the compressing-rollers. The inclined feed-board N is made detachable, as shown, so that it can be readily removed when the machine is used for making snaps or soft-dough goods.

The preliminary feed-apron and the compressing-rollers F, co-operating therewith, constitute an important feature of my invention, as they render the machine useful for making snaps as well as soft and hard dough goods without adding materially to its cost. It is obvious, however, that the devices by which the scrap is returned to the feed-hopper can be applied to a machine which does not contain the preliminary feed-apron and the compressing-rollers and in which the sheet of dough passes directly from the dough-press upon the feed-apron, which presents it to the cutters.

I claim as my invention—

1. In a cracker-machine, the combination, with a dough-press, of a preliminary feed apron or carrier arranged underneath the dough-press, compressing-rollers arranged at the delivery end of the preliminary apron, and a main feed apron or carrier arranged underneath the delivery end of the preliminary apron and said compressing-rollers, substantially as set forth.

2. In a cracker-machine, the combination, with a dough-press, of a preliminary feed apron or carrier arranged underneath the dough-press, compressing-rollers arranged at the delivery end of the preliminary apron and separated from said delivery end by a space through which the sheet of dough may pass, and a main feed apron or carrier arranged underneath the delivery end of the preliminary apron and said compressing-rollers, substantially as set forth.

3. The combination, with the feed-hopper and feed-rollers, the cutter mechanism, and the feed-apron which presents the sheet of dough to the cutter mechanism, of a return-carrier which receives the scrap-dough after it has passed the cutter mechanism and returns it to the feed-hopper, substantially as set forth.

4. The combination, with the feed-hopper and feed-rollers, the cutter mechanism, and the feed-apron which presents the sheet of dough to the cutter mechanism, of an elevating-apron arranged in rear of the cutter mechanism and receiving the scrap-dough from the feed-apron, and a return-apron which receives the scrap from the elevating-apron and conveys it to the feed-hopper, substantially as set forth.

5. The combination, with the feed-hopper, the feed-rollers, the cutter mechanism, and the feed-apron which presents the sheet of dough to the cutter mechanism, of an elevating-apron arranged in rear of the cutter mechanism and receiving the scrap-dough from the feed-apron, and a return-apron which receives the scrap from the elevating-apron and which is vertically movable at its rear end, substantially as set forth.

6. In a dough-press, the combination, with the hopper having a restricted throat or discharge-opening and feed-rollers arranged in the hopper above its restricted throat and journaled removably in their bearings, of a table or support arranged underneath the feed-rollers, substantially as set forth.

7. In a cracker-machine, the combination, with a feed-apron, of a dough-press arranged over said feed-apron and having feed-rollers, and outwardly-extending tables arranged underneath said feed-rollers, which catch the scraps from the feed-rollers and prevent the same from falling upon the feed-apron below, substantially as set forth.

Witness my hand this 6th day of October, 1891.

JAMES W. RUGER.

Witnesses:
F. C. GEYER,
ALICE G. CONNELLY.